Sept. 20, 1932.  I. C. BAKER  1,878,618
AIR CONDITIONING
Filed Oct. 4, 1929   2 Sheets-Sheet 2
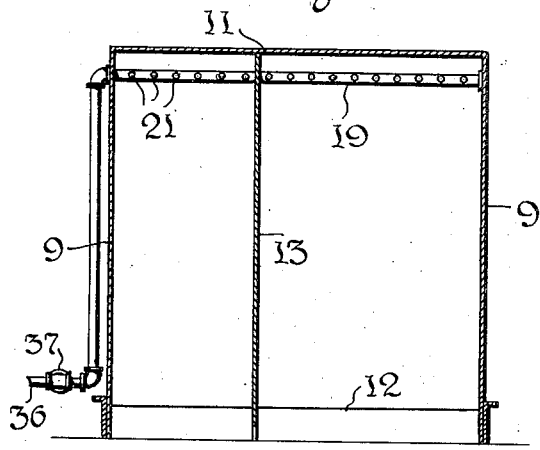
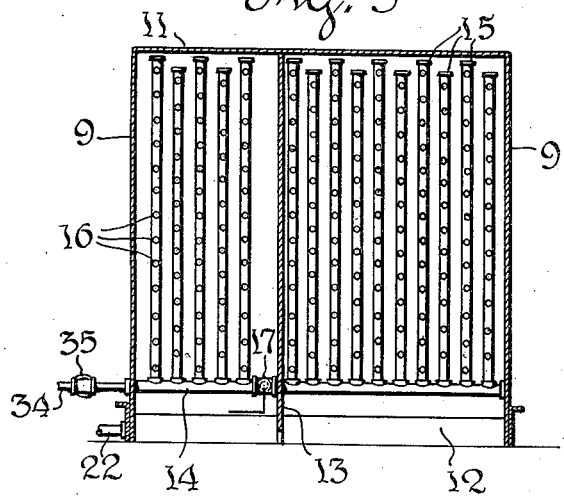
Inventor
Irving C. Baker
By Dodge and Sons
Attorneys Patented Sept. 20, 1932

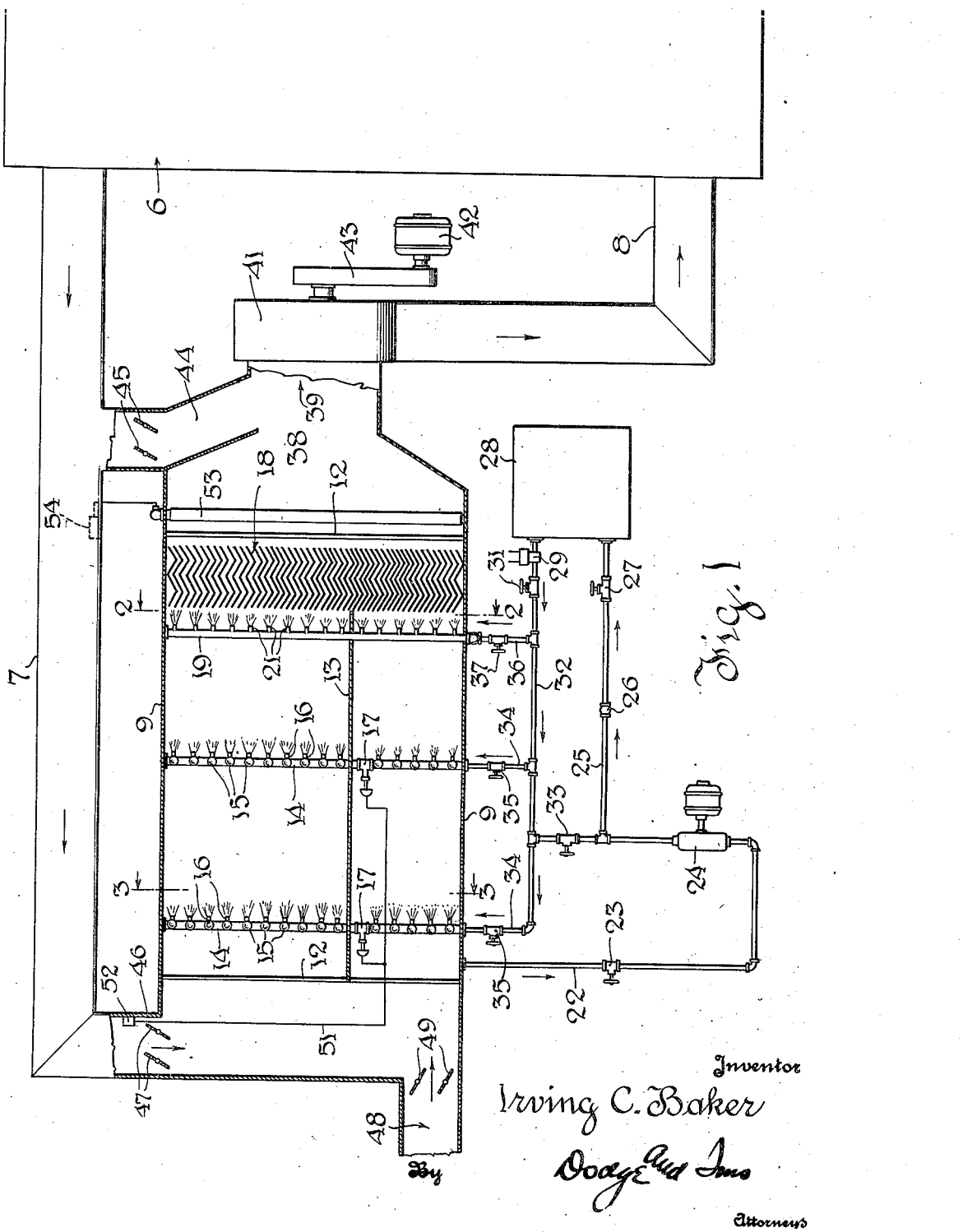

1,878,618

REISSUED

UNITED STATES PATENT OFFICE

IRVING C. BAKER, OF YORK, PENNSYLVANIA, ASSIGNOR TO YORK ICE MACHINERY CORPORATION, OF YORK, PENNSYLVANIA, A CORPORATION OF DELAWARE

AIR CONDITIONING

Application filed October 4, 1929. Serial No. 397,330.

This invention relates to air conditioning, and is primarily directed to that type of apparatus which includes refrigerated washer sprays and is used to reduce the absolute humidity of air in industrial processes, and for maintaining conditions in auditoriums and other places of public assembly. In some cases the air to be conditioned will be merely air drawn from the enclosure whose condition is to be controlled, but in most cases the air to be conditioned will be such withdrawn air plus an admixture of fresh air.

It has heretofore been proposed to mix with the conditioned air, before this is delivered to the room whose condition is controlled, a substantial amount of untreated air also withdrawn from the room. The effect of this is to increase the total volume of air in circulation without increasing the volume passing through the conditioner, and also to permit the conditioner to operate at a lower temperature and, consequently, with a more effective application of the refrigerative machinery.

In effect, the conditioned air is mixed with the air from the room to temper the conditioned air and permit this to be delivered to the room in a condition more nearly approximating that which it is desired to maintain in the room.

Stated differently, the mixture which is the ultimate result of the circulation is made outside of the room rather than within the room, and the tendency to produce cold drafts is reduced to a considerable extent.

In one prior arrangement known to me, the control of the condition of the air delivered to the room is had by varying the proportions of the re-circulated air passed through and by-passed around the washer.

The present invention contemplates the maintenance of a constant proportion of these two air flows and a variation of the refrigerative effect in the washer produced by operating a variable number of spray heads.

Another feature of the invention is the arrangement of the device in such a way that when fresh air is taken into the washer it will pass through those sprays which are constantly in operation.

Tests demonstrate that regulation by controlling the spray heads in the manner stated is more precise and more responsive than regulation by controlling proportioning dampers, and the installation is obviously more simple.

To insure that all air passing through the washer is cleansed, provision is made to spray or flood the eliminators throughout the entire width of the washer at all times. Flooded eliminators are effective in cleansing the air, and as the flooding water is refrigerated, the eliminators do have a slight air cooling and de-humidifying effect.

It follows that all air passing through the washer is conditioned to a limited extent, even though some of the washer sprays are shut down.

A preferred embodiment of the invention is illustrated somewhat diagrammatically in the accompanying drawings in which,—

Fig. 1 is a plan view partly in section showing the air conditioning apparatus connected with a room, or other enclosure.

Fig. 2 is a section on the line 2—2 of Fig. 1 looking in the direction of the arrows.

Fig. 3 is a section on the line 3—3 of Fig. 1 looking in the direction of the arrows.

In the drawings, 6 represents any room or enclosure in which the air is to be maintained at a desired condition as to either temperature or relative humidity or both. The purpose may be to maintain uniform conditions in industrial processes or to establish comfortable conditions for persons in the room.

7 represents a duct through which air is withdrawn from the room, and 8 represents a duct through which conditioned air is delivered back into the room. For purposes of illustration, a single duct 7 and a single duct 8 are shown, but it is common practice to branch either or both of these ducts so that withdrawal and delivery may take place at a number of points simultaneously, and such an arrangement is not excluded from the scope of the present invention.

The side walls of an air washer are indicated at 9 and the top wall is indicated at 11. The bottom of the duct so formed is constructed as a sump or tank to collect water sprayed in the device, and the end walls of this sump are indicated at 12 on Fig. 1. The washer duct thus formed is divided longitudinally by a vertical partition 13.

In the example shown this provides two ducts, one about two-fifths and the other about three-fifths of the total width of the entire washer duct. The partition 13 terminates short of the bottom of the duct so that the water in the sump may pass beneath it, but it substantially isolates the two sections of the washer duct.

Extending transversely of the washer, and the entire width thereof are a plurality of water manifolds 14. Two are shown, but any desired number may be used. Each of the manifolds 14 carries a plurality of upstanding risers 15 and the risers are equipped with spray heads 16, preferably arranged in staggered relation, as indicated in Fig. 3.

Interposed in each manifold 14 is a diaphragm-actuated valve 17, and the closure of these valves shuts off the water from that portion of the manifold which is to the right of the partition 13 (as viewed in Fig. 3).

Extending across the washer duct within the top thereof and adjacent to the eliminator plates 18, is a manifold 19 provided with a row of spray heads 21 which spray water upon the upper ends of the eliminator plates 18. The water so sprayed drenches the eliminator plates from top to bottom, trickling down the surface of the plates so as to maintain these wetted at all times, and so as to wash down to the sump any solids which may be removed from the air by the plates.

There is a water cooling and circulating system which takes water from the sump, passes it through a cooler which reduces the water to a definite temperature, and then delivers this water to the spray heads by way of the manifolds 14 and 19.

To produce this result, the water is drawn off through a pipe 22 which is controlled by a stop valve 23, passes through a pump 24 and is delivered through a pipe 25, which contains a check valve 26 and a stop valve 27, to a cooling device represented generally by the numeral 28.

It will be understood that the refrigerating device 28 is of any known automatically controlled type operating to cool the water to a definite temperature. Such devices are well known in the refrigerating art. A thermostat 29 on the cold water pipe is illustrated to typify any temperature regulating means. This would control the refrigerating mechanism (not shown) to maintain constant the temperature of the cooled water.

Water so chilled is delivered through a stop valve 31 to a cold water line 32. A by-pass valve 33 is provided to permit the refrigerating device to be cut out in case it is desired to use the washer as a humidifier. In such case the valves 31 and 27 are closed and valve 33 is open.

The normal condition is with valve 33 closed and valves 31 and 27 open. The valve 23 is open whenever the device is in operation.

The cold water line 32 delivers to branches 34, each of which feeds a corresponding manifold 14 through a normally open stop valve 35, and there is also a branch 36 which feeds the manifold 19 through a normally open stop valve 37.

It will be observed that when the device is in operation, all the spray heads on the manifold 19 will operate at all times, while on the manifold 14 those spray heads between the valve 35 and the valve 17 will operate at all times, and the spray heads beyond the valve 17 will operate only when these valves are open.

It will be observed that beyond the eliminators 18 there is a mixing chamber 38, which discharges through a reduced passage 39 into the intake of a centrifugal fan 41. The fan 41 delivers into the duct 8 and is driven by a motor 42 which is connected to the fan by a belt 43.

Leading from the return duct 7 is a duct 44 which discharges into the chamber 39. The flow through the duct 44 may be controlled by manually set dampers 45. These are used only to establish the desired proportions of flow and are not used to regulate the operation of the conditioner.

There is also a branch 46 leading from the duct 7 to the entrance end of the washer, and preferably this enters to that side of the partition 13 in which the sprays are turned on and off. The branch passage 46 may be controlled by manually adjusted dampers 47 similar to the manually adjusted dampers 45.

There is also a fresh air duct 48 controlled by manually set dampers 49. The fresh air inlet 48 preferably delivers its air directly to that side of the washer in which the sprays operate constantly, to the end that all outside air shall be completely dehumidified and washed before entering circulation. Leakage around windows and doors will compensate for the extra air thus introduced into room 6.

The valves 17 have been described as diaphragm-actuated valves and are arranged to be controlled through an air line 51 by means of a thermostat 52 in duct 46. It follows that these valves are operated in response to the condition of air withdrawn from the space 6.

Though I prefer pneumatically operated valves and a thermostat of the pneumatic type, various other types are known, notably, electrically actuated valves controlled by a suitable thermostat, and no limitation to any particular type of thermostatic control is implied. Any known type may be used Under ordinary circumstances, where it is desired to maintain a definite dry bulb temperature in the space 6, the thermostat 52 would be of the dry bulb type. In certain industrial processes, where it is desired to maintain a definite relative humidity, the thermostat 52 would be of the wet bulb type. In such case, if it is desired also to control dry bulb temperature, the result can be produced by controlling a heating device such as the radiator 53 by means of a dry bulb thermostat 54. In many installations, however, the parts 53 and 54 are unnecessary and would be eliminated.

The dampers 45, 47 and 49 are not used in the control of the humidifying mechanism. They can be eliminated altogether by properly proportioning the ducts 44, 46 and 48 to give the desired proportions of flow through the three ducts. As local conditions are apt to affect circulation in some degree, it is generally desirable to make the duct slightly over sized and then adjust the dampers by trial and error until the desired standard condition is secured. When secured, the dampers are fixed in position. Regulatory action is produced solely by turning off and on a portion of the spray heads.

As illustrative of the conditions characteristic of the device, the following figures taken from a particular installation will be given:

The total circulation by fan 41 was 30,000 feet, of which 6,000 feet was fresh air entering at 48, 11,000 was recirculated air passing through the conditioner by a duct 46 and 13,000 feet was by-passed air entering through the duct 44.

With air entering at 75 degrees Fahrenheit dry bulb and 64 degrees wet bulb, the air passing through the sprays from the heads 16 and then through the flooded eliminators would enter the chamber 38 saturated at 53 degrees.

Air passing through the flooded eliminators only, and not encountering sprays from the heads 16, was discharged from the eliminators with a dry bulb temperature of 67 and a wet bulb temperature of 60. The temperature of the sprayed water was approximately 50 degrees.

A device of the character described gives prompt and precise regulation and is economical to operate. It has the important advantage that the rate of flow through the washer is constant at all times, with the result that the fan delivery is uniform.

The detailed description given above is intended to be illustrative and not limiting, and various changes within the scope of the invention are possible.

What is claimed is,—

1. The method of maintaining desired conditions in a room, which consists in passing fresh air and air drawn from the room in substantially constant relative proportions through refrigerated water sprays, varying the number of sprays in operation in response to conditions in the room, to vary the averaged refrigerating effect on the air, mixing the air so treated with a substantially constant relative proportion of untreated air drawn from the room and discharging the resulting mixture into the room, the rate of such discharge being maintained substantially uniform.

2. The method of maintaining desired conditions in a room, which consists in passing fresh air and air drawn from the room in substantially constant relative proportions through refrigerated water sprays, varying the number of sprays in operation in response to conditions in the room, to vary the averaged refrigerating effect on the air, passing the air so treated over baffle surfaces flooded with refrigerated water, and mixing the air after passing such baffle surfaces with a constant relative proportion of untreated air drawn from the room, and discharging the resulting mixture into the room, the rate of such discarge being maintained substantially uniform.

3. The method of maintaining desired conditions in a room which consists in passing fresh air and air drawn from within the room in substantially constant relative proportions through refrigerated water sprays, subdividing the air passing through the sprays into two currents, the first of which consists primarily of said withdrawn air and the second of which includes substantially all of the fresh air; turning off and on sprays through which the first current passes to vary the refrigerating effect in response to conditions in the room, mixing the two currents of air with a substantially constant relative proportion of untreated air also withdrawn from the room, and discharging the resulting mixture into the room, the rate of such discharge being maintained substantially uniform.

4. The method of maintaining desired conditions in a room which consists in passing fresh air and air drawn from within the room in substantially constant relative proportions through refrigerated water sprays, subdividing the air passing through the sprays into two currents, the first of which consists primarily of said withdrawn air and the second of which includes substantially all of the fresh air; turning off and on sprays through which the first current passes to vary the refrigerating effect in response to conditions in the room, passing both currents of air over baffle surfaces flooded with refrigerated water, mixing the air after passing said baffle surfaces with a substantially constant relative proportion of untreated air also withdrawn from the room, and discharging the resulting mixture into the room, the rate of such discharge being maintained substantially uniform.

5. In an air conditioner, a washer having the usual sprays; automatic control means associated with certain of said sprays to render the same operative or inoperative independently of the remainder thereof; means for supplying fresh air at a uniform rate to the inlet of said washer; and means for supplying recirculated air at a uniform rate to the inlet of said washer, and at a uniform rate to the outlet of said washer.

6. In an air conditioner, a washer having the usual sprays; automatic control means associated with certain of said sprays to render the same operative or inoperative independently of the remainder thereof; eliminators beyond said sprays; means for flooding said eliminators; means for supplying fresh air at a uniform rate to the inlet of said washer; and means for supplying recirculated air at a uniform rate to the inlet of said washer, and at a uniform rate to the outlet of said washer beyond said eliminators.

In testimony whereof I have signed my name to this specification.

IRVING C. BAKER.